(12) United States Patent
Carter et al.

(10) Patent No.: US 10,551,202 B2
(45) Date of Patent: Feb. 4, 2020

(54) GENERATING ITINERARY DESTINATIONS AND RECOMMENDATIONS FROM SCANNED CONTENT

(71) Applicant: FUJI XEROX CO., LTD., Tokyo (JP)

(72) Inventors: Scott Carter, Menlo Park, CA (US); Matthew L. Cooper, San Francisco, CA (US); Jennifer Marlow, Palo Alto, CA (US); Francine Chen, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 179 days.

(21) Appl. No.: 15/701,186

(22) Filed: Sep. 11, 2017

(65) Prior Publication Data

US 2019/0078900 A1 Mar. 14, 2019

(51) Int. Cl.
*G01C 21/34* (2006.01)
*G01C 21/36* (2006.01)

(52) U.S. Cl.
CPC ......... *G01C 21/343* (2013.01); *G01C 21/362* (2013.01); *G01C 21/3664* (2013.01); *G01C 21/3623* (2013.01)

(58) Field of Classification Search
CPC .. G01C 21/343; G01C 21/362; G01C 21/366; G01C 21/3623
See application file for complete search history.

(56) References Cited

U.S. PATENT DOCUMENTS

| | | | | |
|---|---|---|---|---|
| 6,744,938 B1 * | 6/2004 | Rantze | ..................... | G06K 9/00 382/312 |
| 6,976,032 B1 * | 12/2005 | Hull | ...................... | G06Q 10/10 |
| 8,463,299 B1 * | 6/2013 | Hladik, Jr. | ............ | H04W 4/021 345/660 |
| 8,712,688 B2 * | 4/2014 | Forte | ...................... | G01C 21/20 701/516 |
| 2013/0113936 A1 * | 5/2013 | Cohen | ..................... | G07B 15/02 348/148 |
| 2015/0142429 A1 * | 5/2015 | Ondeck | .................. | G10L 19/00 704/231 |

OTHER PUBLICATIONS

Kevin Cheng, et al. "Cozymaps: Real-time collaboration on a shared map with multiple displays," Proceedings of the International Conference on Human-Computer Interaction with MObile Devices and Services, MobileHCI '15, pp. 46-51, ACM 2015.
Matthias Geel, et al. "Presishare: Opportunistic sharing and presentation of content using public displays and qr codes," Proceedings of the International Symposium on Pervasive Displays, PerDes '13, pp. 103-108, ACM 2013.
Nick Taylor, et al. "Social interatction around a rural community photo display," International Journal of Human-Computer Studies, 67(12)1037-1047 (2009).

* cited by examiner

*Primary Examiner* — Michael J Zanelli
(74) *Attorney, Agent, or Firm* — Procopio, Cory, Hargreaves & Savitch LLP

(57) ABSTRACT

For tourists, interactions with digital public displays often depend on specific technologies that users may not be familiar with (Quick Response codes, near field communication, and so on) may not have access to because of networking issues, may lack a required application or device technology, may not want to use because of time constraints, or may not want to use because they are worried about sharing their data with a third-party service. Example implementations described herein are directed to a system that allows users to seamlessly share content with a public travel kiosk system.

18 Claims, 9 Drawing Sheets

Sushi

Tuna $3

Yellowtail $3

Salmon $3

Sashimi

Tuna $3

Yellowtail $3

Salmon $3

Bento Box

Set A $10

Set B $13

Set C $15

XYZ Sushi

1234 ABC Rd.
Palo Alto, CA, 94304

FIG. 3(a)

| Templates |
|---|
| Mobile application template A |
| Mobile application template B |
| Mobile application template C |
| Document template D |
| .... |

FIG. 4(a)

| Locations | Addresses | Telephone | Map | Images |
|---|---|---|---|---|
| Location A | Address A | Telephone A | Map A | Image(s) A |
| Location B | Address B | Telephone B | Map B | Image(s) B |
| Location C | Address C | Telephone C | Map C | Image(s) C |
| Location D | Address D | Telephone D | Map D | Image(s) D |
| .... | .... | .... | .... | .... |

FIG. 4(b)

GENERATING ITINERARY DESTINATIONS AND RECOMMENDATIONS FROM SCANNED CONTENT

BACKGROUND

Field

The present disclosure relates to kiosk systems, and more specifically, methods and systems associated with generating travel itinerary destinations and recommendations based on scanned content.

Related Art

Despite the global diffusion of mobile devices and networks, tourists navigating new environments continue to rely on public displays, such as large printed maps or interactive digital directories. These displays can provide a curated set of sites and events specific to a particular place, and are sufficiently large to allow group discussion and collaboration. Such displays can fill gaps in local knowledge when mobile device coverage is poor (for example, in subterranean subway systems).

While public displays are useful on their own, the ubiquity of personal devices means that designs of digital public display systems should permit users to transfer data back-and-forth between the display and the user mobile device. The most common related art implementation of enabling such transfers in the related art include asking users to input their email address/phone number to send information via e-mail or text, or by having the user scan a Quick Response (QR) code. Such related art implementations require that users have a separate QR code reader application already installed on their mobile devices, and require that the users have internet access at the time when they desire relevant tourism information, for example.

However, users (particularly from North America, or other countries where the use of QR codes is not widespread) rarely install these required applications. First, users are often not aware of the need to install applications for public display interaction while planning their trip. Even if users are aware of code reading applications, it may be difficult to anticipate their importance. Additionally, when tourists seeking information actually face a public display during their trip, installing new applications can be inconvenient if they are heading to another destination, have poor internet connectivity, or are anxious about the privacy implications of downloading third-party applications.

SUMMARY

To address these concerns, example implementations described herein involve a public kiosk system that allows people to create and edit itineraries using seamless interactions between a mobile phone and a larger public display. Users can build an itinerary using recommendations shown on the public display, or send recommendations to the display via a camera-based scanner integrated into the kiosk. Users can share recommended sites with the display using either barcodes generated with any third-party barcode application, or simply having the kiosk camera scan the user mobile device screen. The kiosk system can automatically determine the site, add it to the current itinerary, and update a list of other recommended sites that complement the current itinerary. Users can also scan content from paper flyers or other documents. In this way, on-the-go tourists can leverage their personal devices and interactive public displays without the hassle or worry of downloading a third-party application.

Aspects of the present disclosure can include a kiosk system, which can involve a camera; and a processor, configured to utilize the camera to scan, from a physical object, one or more destinations for an itinerary; construct the itinerary, the itinerary involving an ordered list of the one or more destinations and routing information from the apparatus to the one or more destinations based on the ordered list of the one or more destinations; and display the itinerary.

Aspects of the present disclosure further include a method for a kiosk system, which can involve utilizing a camera to scan, from a physical object, one or more destinations for an itinerary; constructing the itinerary, the itinerary comprising an ordered list of the one or more destinations, and routing information from the apparatus to the one or more destinations based on the ordered list of the one or more destinations; and displaying the itinerary.

Aspects of the present disclosure further include a non-transitory computer readable medium, storing instructions for a kiosk system, which can involve utilizing a camera to scan, from a physical object, one or more destinations for an itinerary; constructing the itinerary, the itinerary comprising an ordered list of the one or more destinations, and routing information from the apparatus to the one or more destinations based on the ordered list of the one or more destinations; and displaying the itinerary.

Aspects of the present disclosure further include a kiosk system, which can involve means for utilizing a camera to scan, from a physical object, one or more destinations for an itinerary; means for constructing the itinerary, the itinerary comprising an ordered list of the one or more destinations, and routing information from the apparatus to the one or more destinations based on the ordered list of the one or more destinations; and means for displaying the itinerary.

BRIEF DESCRIPTION OF DRAWINGS

FIG. 3(a) illustrates an example physical object that can be scanned by the kiosk system, in accordance with an example implementation.

FIGS. 4(a) and 4(b) illustrate examples of management information, in accordance with an example implementation.

DETAILED DESCRIPTION

Figure 1A:
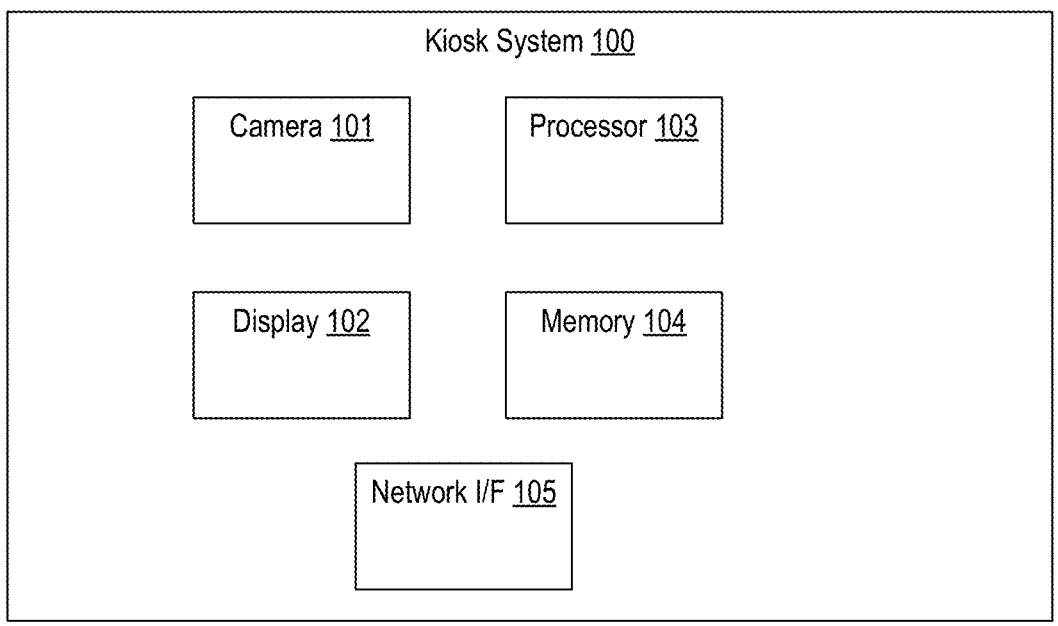
FIGS. 1(a) and 1(b) illustrate example system diagrams upon which example implementations may be applied.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In the related art, there are kiosk systems with interactive digital signage configured to navigate to new environments, often using the displays in concert with their mobile devices, to explore unfamiliar areas. The large displays augment mobile device information by providing a curated set of sites and events specific to a particular place. They are also large enough to allow group discussion and collaboration. Finally, such related art public displays supply easily accessible local information when mobile device signal coverage is poor. However, people still want to access local information or navigate instructions on their mobile phones when away from a public display. Therefore, example implementations as described herein involve solutions that allow users to transfer data back and forth between displays and mobiles.

Most existing related art systems utilize specialize applications such as QR code readers or custom software that can facilitate data migration from public displays to personal devices. There are no related art examples of systems that allow people to send information from their mobile phones to a public display system without requiring the installation of additional applications. Further, tourists rarely install these additional applications for several reasons—among them, privacy, connectivity, language, reliability and ease of use.

To address these concerns, example implementations described herein integrate an itinerary scanner with a public kiosk system that allows people to build itineraries using a combination of information from a public display and from their own mobile device. They can do this independently on the display of the kiosk system, or work with others to create and edit itineraries collaboratively without installing a special application. Users can build an itinerary using suggested recommendations shown on the public display, or contribute their own personal recommendations to the display via a camera-based scanner integrated into the kiosk system. This scanner allows users to share recommended sites with the display by simply having the camera of the kiosk system scan the mobile device screen. The kiosk system will automatically determine the site, add an event and/or location associated with the site to the current itinerary, and update a list of other recommended sites that complement the places currently listed in the itinerary. Users can also scan content from paper flyers, barcodes, or other physical objects depending on the desired implementation.

When users are satisfied with their selections, the user can take a photo of the itinerary on the public display screen, or use a bar code scanning application on their phone if they have one, to scan a QR code on the public display to download the itinerary to their device. In this manner, on-the-go tourists can leverage their personal devices and interactive public displays without sacrificing privacy through downloading additional third-party applications.

Further, the example implementations as described herein can provide more flexibility than a concierge providing a static solution, and may provide real-time capability to modify the itinerary without requiring sequential reordering or reconsideration of the itinerary. Tourist plans can change all the time, and static itineraries provided by a concierge may become useless very quickly. Example implementations can provide an image of exactly where the user needs to go based on either the current map or based on the location of the kiosk system. Thus, should the user change their mind at a later point in time, the user can visit the kiosk system and change the itinerary information based on new information, without having to go to a centralized concierge. Further, in example implementations where the user takes a picture of the itinerary and the picture contains a QR code or bar code, the user can later use that QR code or bar code on another kiosk system to restore the itinerary at the kiosk system, whereupon the user can then modify the itinerary as needed.

Figure 1B:
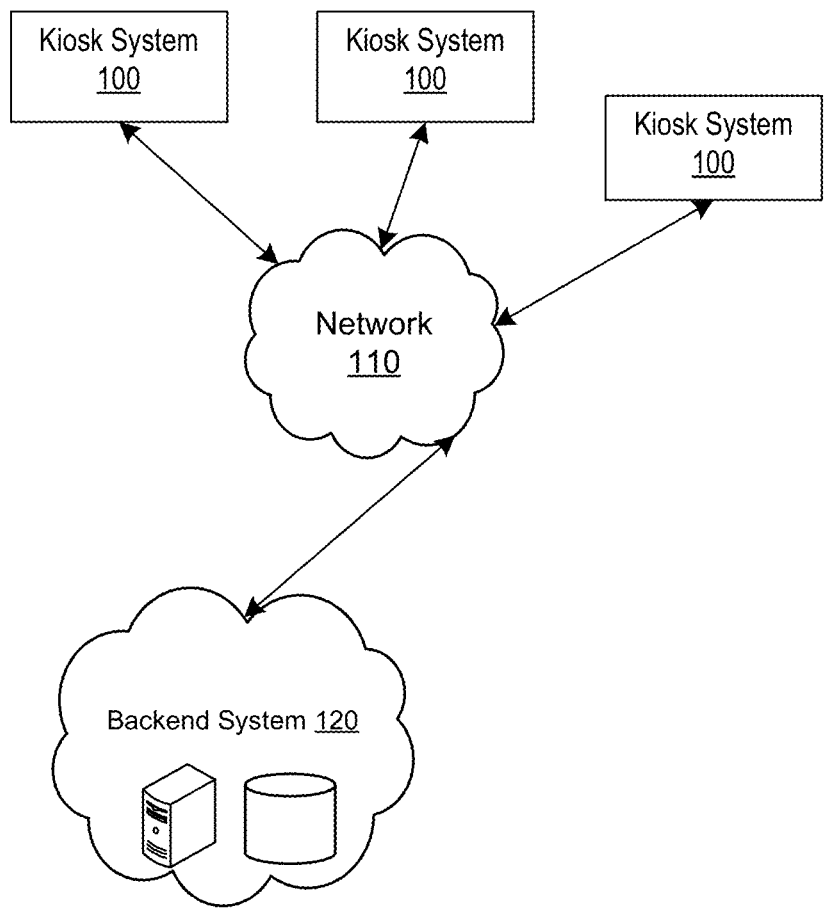

FIGS. 1(a) and 1(b) illustrate example system diagrams upon which example implementations may be applied. Specifically, FIG. 1(a) illustrates a kiosk system in accordance with an example implementation. Kiosk system 100 can include a camera 101, display 102, central processing unit (CPU) 103, memory 104 and network interface (I/F) 105. As illustrated in FIG. 1(a), example implementations described herein can involve a public display kiosk that can include an itinerary creation web application running on a public display 102; a camera 101 and processing unit 103 to scan mobile phone screens and documents; and a network-based multimedia messaging system to pass content between the mobile device and the kiosk. In example implementations, the scanning component processes video preview frames continuously in two separate threads, wherein one thread detects and can process barcodes representing content from a set of travel and recommendation mobile applications known to users of the kiosk 100. When the kiosk 100 detects supported content, the kiosk 100 extracts the embedded content (such as the title of a restaurant, museum, or other place of interest) and sends it to the public display 102 via the messaging system. The display 102 may involve a touch screen that facilitates input and output between the user and the kiosk system 100.

Figure 2A:
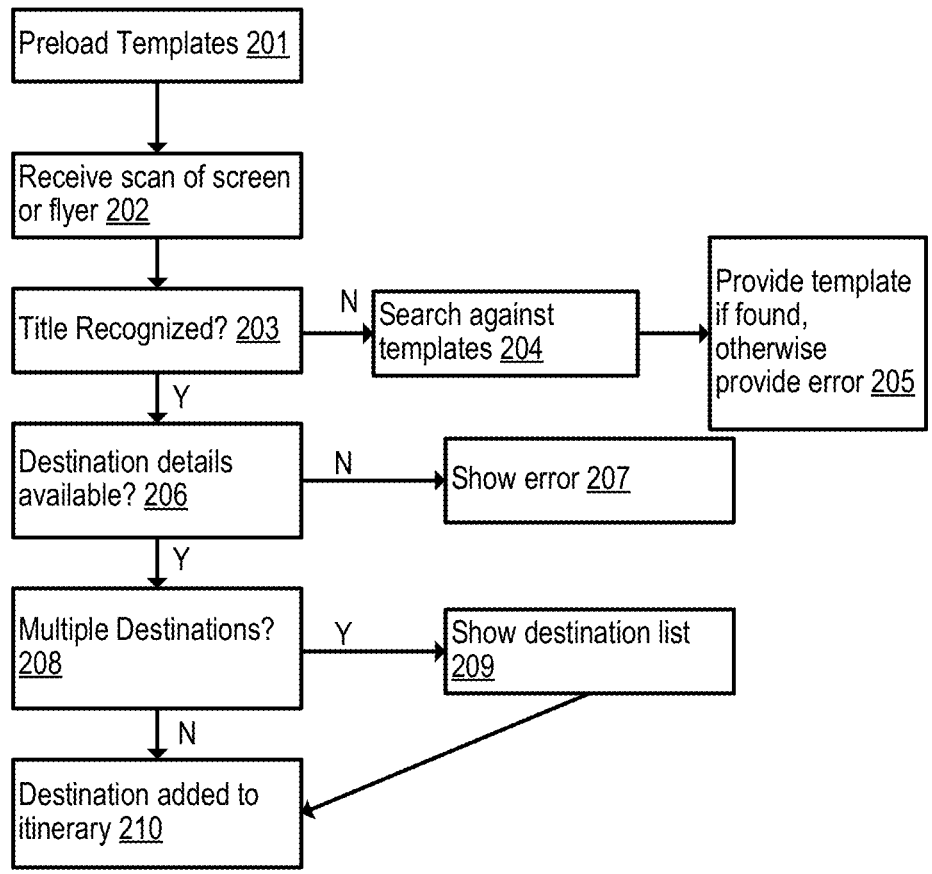
FIGS. 2(a) and 2(b) illustrate example flow diagrams upon which example implementations may be implemented.
Figure 2B:
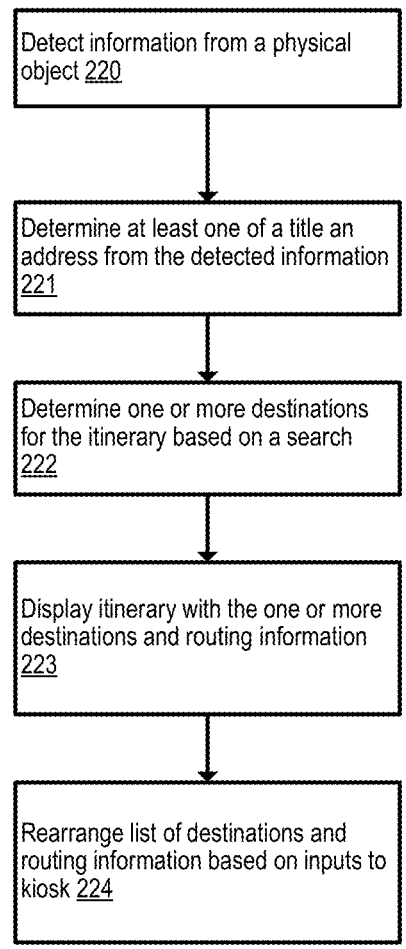

In example implementations described herein, CPU 103 can be configured to execute the flow diagrams as illustrated in FIGS. 2(a) and 2(b), and can be configured to utilize the camera 101 to scan, from a physical object, one or more destinations for an itinerary. The physical object can involve the screen of a mobile device or other user device, a physical document such as a flyer, a travel booklet, QR codes, maps, or any other physical object that display information associated with the itinerary of the user. In response to the scan, CPU 103 can then construct the itinerary, which can involve an ordered list of the one or more destinations, and routing information from the apparatus to the one or more destinations based on the ordered list of the one or more destinations and display the itinerary as illustrated and described in FIG. 3(c). In example implementations, the display 102 utilized can be a touch screen interface, wherein the CPU 103 is configured to, in response to input on the ordered list displayed on the touch screen interface that changes the ordered list, reconstruct the itinerary and modify the display of the map based on the input through re-execution of the processes as described at FIGS. 2(b) and 3(c). Further, the display 102 can be configured to display the ordered list and the map such that the ordered list and the map can be received by a user device without any special application installed on the user device, such as providing an indication that the display contents should be received by the user device through the user taking a picture of the display contents, and/or providing the display contents in a manner wherein a user device can take a picture through a camera or other image receiving device or hardware component. Through the example implementations described herein, kiosk system 100 can receive and process information from a physical object without requiring any special application or connection from the physical object. Should the physical object be a user device, such as a cell phone, the user can thereby retain privacy without having to connect to the kiosk system 100 or download any special application to interact with the kiosk system 100.

Figure 3B:
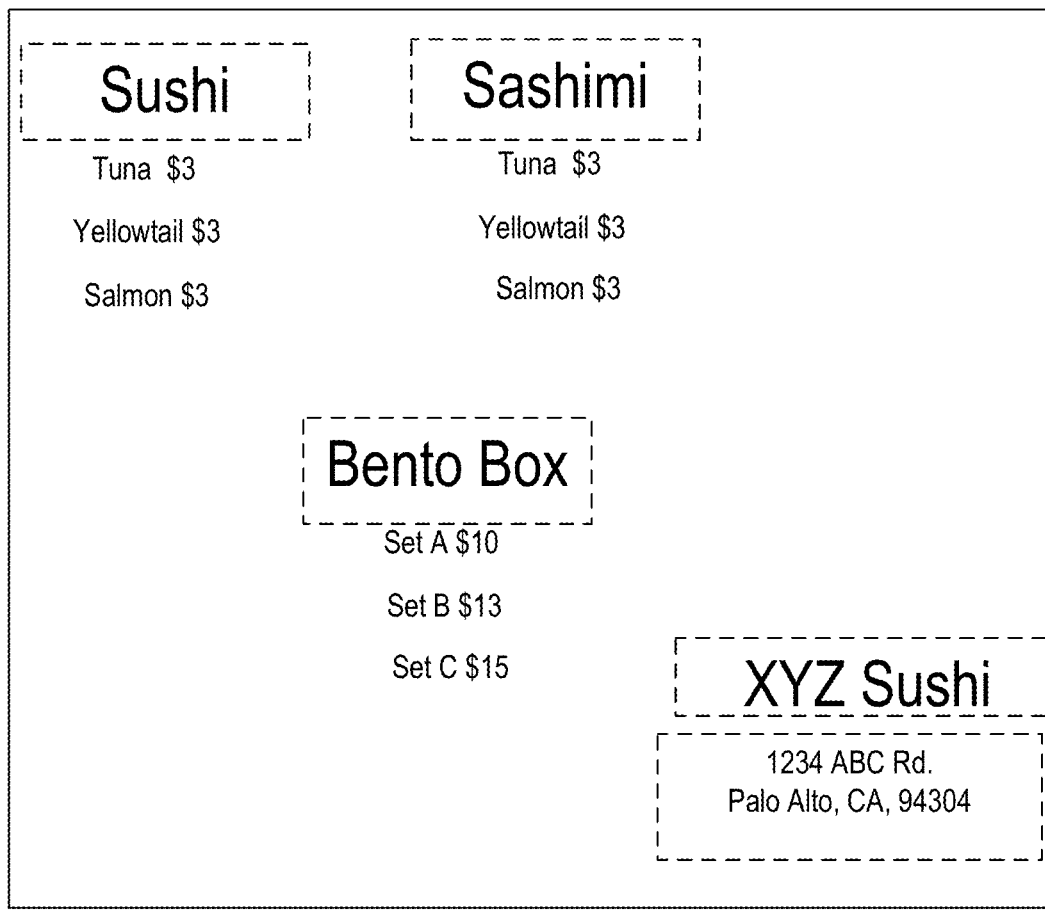
FIG. 3(b) illustrates an example of processing of the physical object of FIG. 3(a), in accordance with an example implementation.

As illustrated in FIGS. 2(a) and 2(b), CPU 103 can also be configure d to utilize the camera 101 to scan, from the physical object, one or more destinations for the itinerary through detecting, from the physical object, one or more text regions; determining, from the one or more text regions, at least one of a title and an address; and determining the one or more destinations for the itinerary through conducting a search of the at least one of the title and the address as illustrated in FIGS. 3(a) and 3(b). Depending on the desired implementation, CPU 103 can be configured to determine, from the one or more text regions, at least one of the title and the address through providing the detected one or more detected text on the display based on one or more parameters; and processing a user selection of the provided one or more detected text as the at least one of the title and the address. Such parameters can include text having the largest text size within the physical document, text as selected by the user through use of the kiosk system 100, text that fits the detection of a particular format (e.g., telephone number, address with zip code, street address, text associated with a labeled map, etc.), and so on according to the desired implementation.

FIG. 1(b) illustrates a network of kiosks, in accordance with an example implementation. The system can include one or more kiosks 100 as illustrated in FIG. 1(a) connected to a network 110, such as a local area network (LAN), or a wide area network (WAN) depending on the desired implementation. In example implementations, a backend system 120 may also be utilized to provide information to each of the kiosks 100, such as search results, routing information, maps, and so on according to the desired implementation. The backend system 120 may be implemented as a cloud or as a separate server, depending on the desired implementation.

Example implementations involve a public display kiosk itinerary planning system that allows users to add destinations without requiring them to install a third-party application of any kind or initiate any connection to the kiosk. Such implementations involve optionally preloading a set of image templates of well-known web sites, applications, and flyers with the title area marked; scanning the screen or document; detecting the most prominent text on the scanned screen or page; searching a third-party Application Programming Interface (API) to determine the destination details; if no destination is found, then comparing the original scan against any saved templates, and if there is a match extracting the place title from the marked location and determining the place details; injecting the destination into the itinerary.

Example implementations address the aforementioned barriers to phone-display sharing on a public display with a solution that does not require the installation of additional apps or even a mobile phone with internet connection to share information between a phone and a larger public display. It also allows users to contribute content to the display and take display content with them. In some example implementations, the initial information need not originate from the mobile device of the user itself.

FIG. 2(a) illustrates an example flow diagram upon which example implementations may be implemented. Specifically, FIG. 2(a) illustrates an example flow that can be executed by the CPU 103 of the kiosk system 100. At 201, the kiosk system is configured to preload templates for matching as described with respect to FIG. 4(a). At 202, the kiosk is configured to receive a scan of a screen of a mobile device or other user device, or of a physical paper flyer (e.g., restaurant menu) or other document. At 203, a determination is made as to whether the title can be recognized. If so (Y) then the flow proceeds to 206, otherwise (N), the flow proceeds to 204 to search the scanned screen/document against the preloaded templates.

At 204, a search is conducted on the received scan against the preloaded templates. At 205, if a matching template is found, then the template is provided to a display, otherwise an error message can be provided to the display instead.

At 206, a determination is made as to whether the destination details are available. If not (N) then the flow proceeds to 207 to provide an error. Otherwise (Y), the flow proceeds to 208 to determine if multiple destinations were detected from the scan.

At 208, a determination is made as to whether multiple destinations were detected from the scan. If so (Y), then the flow proceeds to 209 to provide the destination list to the display. At 210, the destination(s) are added to the itinerary for display.

Figure 3C:
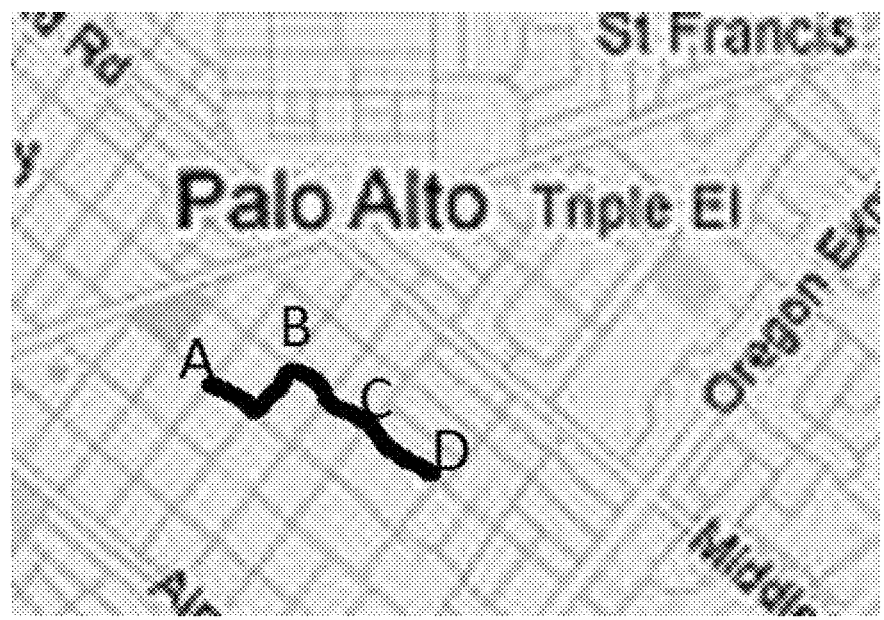
FIG. 3(c) illustrates an example of a display of an itinerary by a kiosk system, in accordance with an example implementation.

FIG. 2(b) illustrates another example flow that can be executed by the CPU 103 of the kiosk system 100, which illustrates an example process to proceed from FIG. 3(a) to FIG. 3(c). At 220, the kiosk system 100 detects information from a physical object.

At 221, the kiosk system 100 determines at least one of a title and an address from the physical object. At 222, the kiosk system 100 determines one or more destinations for the itinerary based on conducting a search of the title and/or the address. At 223, the kiosk system 100 displays the itinerary with the one or more destinations and the routing information. The routing information can be generated by any global positioning satellite (GPS) navigation application or other navigation application in accordance with the desired implementation. Once generated, the kiosk system 100 can display the routing information in the form of a map, as a list of directions, or through other desired implementations. At 224, the list of destinations and routing information is rearranged based on input received to the kiosk system 100 as described in FIG. 3(c).

As described herein, the flow of FIG. 2(b) may be modified according to the desired implementation, and does not have to strictly involve the search of a title or address. Image matching, telephone number matching, QR code or barcode reading, or other matching may also be conducted in accordance with the desired implementation.

FIG. 3(a) illustrates an example physical object that can be scanned by the kiosk, in accordance with an example implementation. The example of FIG. 3(a), involves a paper flyer, however, any physical object (e.g., a screen of a mobile device or other user device, a book page or book cover, a travel pamphlet, a document, etc.) can be utilized.

FIG. 3(b) illustrates an example of processing of the physical object of FIG. 3(a), in accordance with an example implementation. In example implementations, the text can be auto-detected based on the size of the text for detecting the title. In other example implementations, the detected text above a threshold size can be selectable through a touch screen display or other input device, thereby allowing the user to select the desired keywords from the physical object. In such an example implementation, the display can highlight the areas considered to be text areas, wherein users can physically touch the touch screen to indicates the title on the kiosk system, or input such information to the kiosk system through an input device. Depending on the desired implementation, such inputs can involve the selection of multiple regions of text, which can be utilized should a title or street name encompass multiple regions. In example implementations, such inputs can also involve selecting part of the text within the region to encompass a desired region of text within a particular text.

In an example to facilitate the implementation of FIG. 3(b), one of the processing threads attempts to detect text in the image using optical character recognition tools. To reduce errors in the Optical Character Recognition (OCR) analysis, the thread first normalizes image frames and determines the pixel-level difference between subsequent frames. Once the difference between frames falls below a predetermined threshold and is stable for a predetermined interval (e.g. a few seconds), the system saves a frame with values averaged over a smaller window as the baseline frame. The system then compares all further frames to the baseline. At this point the system is trying to determine when new content (e.g., a mobile phone screen or paper flyer) appears below the sensor. To do so, the system continues comparing incoming frames both to recent frames and the baseline frame until new frames are both significantly different from the baseline and are relatively stable compared to recent frames. Having detected new content in the scanning bed area, the camera then snaps a higher resolution photo and processes that with an onboard OCR engine. The engine returns text regions, including bounding boxes and the text content within. The system combines proximate text regions using a connected components algorithm, and then uses heuristics to detect the most likely title text region in the image (e.g., the largest text block closest to the top left of the image). The text within this region is sent on to the messaging system.

In example implementations, the kiosk system can conduct a search based on the detected text, or such a search can be submitted to a backend system of FIG. 1(b). In an example implementation involving a situation where the location or address cannot be ascertained for a given text submission, the submitted text can also be treated as a general search keyword provided by the user. For example, a text selection of "Bento Box" from the screen as illustrated in FIG. 3(b) can cause the kiosk system to provide recommendations for locations having bento boxes that are nearby the kiosk system.

In additional example implementations, the kiosk system can also be configured to detect text known to have a specific pattern, such as an address or a telephone number. For example, because addresses and telephone numbers have a specific structure (e.g., a fixed set of numbers which may include dashes, zip codes, street names, etc.). For example, as illustrated in FIG. 3(b), the address is detected based on the expected structure of a street, city name, and state found in the vicinity of a zip code, however, the example implementations are not limited thereto, and other structures can be utilized to detect addresses and telephone numbers in accordance with the desired implementation. Once such information is detected, the kiosk system can then conduct a search based on information stored in the memory of the kiosk, or from a search given to a backend system as illustrated in FIG. 1(b), to determine the corresponding destination and location.

In additional example implementations, image detection may also be utilized to detect specific images or specific types of images. For example, maps may be detected from the physical object based on the orientation of text as indicated by street names, lines indicating streets, and/or a waypoint marker. In such example implementations, the kiosk can determine the desired area for the destinations of the user based on searching the received street names to a backend system. In other example implementations, known map screenshots or maps provided previously to the kiosk system, or maps associated with popular destinations can be stored in the kiosk system for retrieval, as illustrated in FIG. 4(b).

In example implementations, the image detection can also be extended to images of the location, as illustrated in FIG. 4(b). In such an example implementation, the image can be scanned and compared for similarity against known images associated with a destination as stored in FIG. 4(b), wherein the destinations having the highest similarity score as determined by any desired implementation can be retrieved and displayed on the kiosk system. Further, depending on the desired implementation, the image detection can also be extended to the backend system as illustrated in FIG. 1(b) to conduct image retrieval. In such an example implementation, the backend system can also identify the type of image that is scanned and provide a keyword to the kiosk system to provide related destinations. For example, if the image is that of a bar, the backend system can determine that the image is that of a bar, and instruct the kiosk system to indicate the bars that are nearby the kiosk system.

Once the messaging system passes title text along to the itinerary application, the application performs a search against a third-party API, geofencing the search within a radius (e.g. a few dozen miles) of the pre-configured location of the kiosk. If the application cannot find the requested site, the application shows a brief notification. If the application does find the location, the application adds it to the current itinerary. The application furthermore queries other third-party services connected to the system to determine recommended sites nearby.

Note that in some cases the third-party API may return multiple sites for a given search term. In that case the system shows a pop-up with a subset of the returned sites. The user can then manually select the destination they want to add to their itinerary. In some cases the title of the destination may not be the most prominent text on the screen or flyer. In those cases the system can compare the overall layout of the screen or flyer to well-known templates that have the place title area manually marked. If there is a match, the system can then extract the title text from the marked location on the scan.

Alternatively, the display can present to the user an image of the scanned document annotated with regions highlighting recognized text areas. The user can then select a particular block of text indicating the most important component of the scanned document (e.g., the title). The system can then use the text or metadata associated with this component as the search query.

FIG. 3(c) illustrates an example of a display of an itinerary by a kiosk, in accordance with an example implementation. As illustrated in FIG. 3(c), the display of the itinerary can include a display of the ordered list of destinations 330, and a display of a map 331 involving a route from the kiosk system to the one or more destinations based on routing information determined or retrieved by the kiosk system and the ordered list of destinations 330. The example implementations can thereby provide an ordered list of destinations along with a map that is constructed from routing information from the kiosk system to each of the destinations along the ordered list. Through such an example implementation, the user may thereby take a picture of the screen of the kiosk system, to keep the list of destinations and the map with the directions while retaining privacy and without requiring any special application to be installed on the user device. Depending on the desired implementation, map 331 may be replaced by a display other types of routing information, such as in the form of a list of directions for navigating to each destination in order.

Depending on the desired implementation, the display of the itinerary can involve in the alternative or in conjunction with the display of FIG. 3(c), a display of a Quick Release (QR) code configured to provide the ordered list and the routing information for the user's mobile device. In such example implementations, users can scan the QR code on their mobile device to retrieve the information from a website or through other methods according to the desired implementation.

Further, as illustrated in the example of FIG. 3(c), the kiosk system may involve a touch screen display so that the user can reorganize the list of destinations, and/or insert or delete or replace the destinations within the list. In such an example implementation, the kiosk system can then regenerate the routing information and update the ordered list of destinations 330 and the map information 331.

FIGS. 4(a) and 4(b) illustrate example management information that may be stored in memory of the kiosk system. Specifically, FIG. 4(a) illustrates an example implementation of management information for managing templates. As illustrated in FIG. 4(a), examples of templates can include templates to identify particular mobile applications, known documents such as flyers, books or other documents of locations nearby the kiosk system, and so on. Thus, if the title is not known as illustrated in the flow of FIG. 2(a), the destination can still be identified based on the templates of known applications or other physical objects. An example template can be the base landing page of a particular application (e.g., specific web-page layouts of applications based on location of title, colors used, etc.), can be the page setting (e.g., specific page layout for a given book), layout for flyers from known locations, and so on, depending on the desired implementation.

FIG. 4(b) illustrates an example of management information for managing destinations in memory for the kiosk system. Such destinations can include destinations that may be commonly queried by users to the kiosk system, popular destinations nearby the kiosk, and so on depending on the desired implementation. As illustrated in FIG. 4(b), example management information can include destinations, addresses, telephone numbers, and map information that can be utilized for conducting a search based on the information received from the physical object. For example, if the camera scans a map, the scanned map can be compared to the map information to determine the likely intended destination. Such a search can be conducted based on street names detected, or a hash representing the street lines of the map, or so on, depending on the desired implementation. Image information can include one or more images that are associated with the location, wherein upon receiving a scan with a similar image, the kiosk system can thereby retrieve one or more locations having the most similarity as determined by any desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

Figure 5:
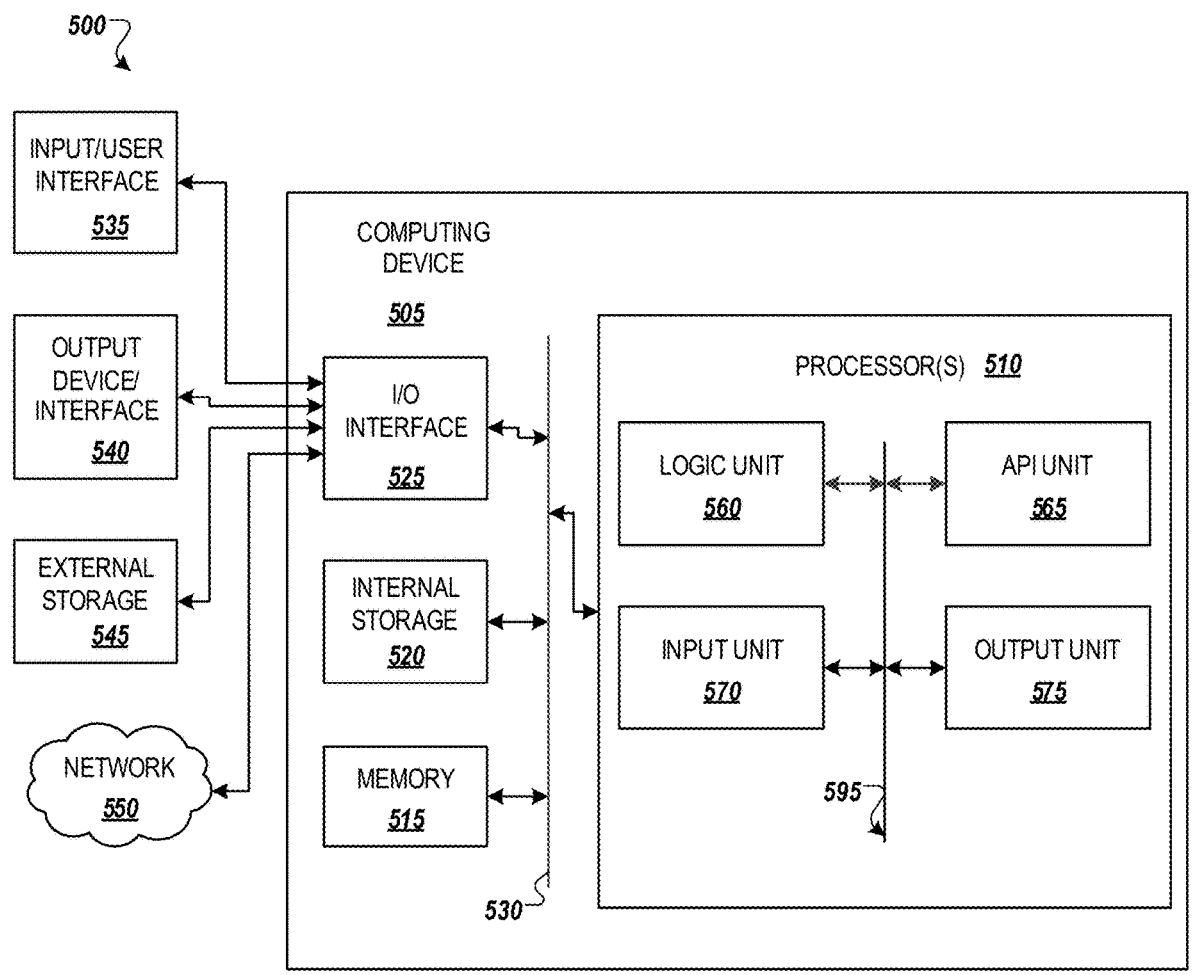
FIG. 5 illustrates an example computing environment with an example computer device suitable for use in some example implementations.

FIG. 5 illustrates an example computing environment with an example computer device suitable for use in some example implementations, such as a kiosk system as illustrated in FIG. 1.

Computer device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in the computer device 505.

Computer device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 540 may include a display, television, monitor, printer, speaker, braille, or the like. In some example implementations, input/user interface 535 and output device/interface 540 can be embedded with or physically coupled to the computer device 505. In other example implementations, other computer devices may function as or provide the functions of input/user interface 535 and output device/interface 540 for a computer device 505.

Examples of computer device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 505 can be communicatively coupled (e.g., via I/O interface 525) to external storage 545 and network 550 for communicating with any number of networked components, devices, and systems, including one or more computer devices of the same or different configuration. Computer device 505 or any connected computer device can be functioning as, providing services of, or referred to as a server, client, thin server, general machine, special-purpose machine, or another label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computer device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, and inter-unit communication mechanism 595 for the different units to communicate with each other, with the OS, and with other applications (not shown). The described units and elements can be varied in design, function, configuration, or implementation and are not limited to the descriptions provided.

In some example implementations, when information or an execution instruction is received by API unit 565, it may be communicated to one or more other units (e.g., logic unit 560, input unit 570, output unit 575). In some instances, logic unit 560 may be configured to control the information flow among the units and direct the services provided by API unit 565, input unit 570, output unit 575, in some example implementations described above. For example, the flow of one or more processes or implementations may be controlled by logic unit 560 alone or in conjunction with API unit 565. The input unit 570 may be configured to obtain input for the calculations described in the example implementations, and the output unit 575 may be configured to provide output based on the calculations described in example implementations.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

The invention claimed is:

1. A kiosk system configured to process information from a physical object without requiring any special application or connection from the physical object, the kiosk system comprising:
   a display;
   a camera; and
   a processor, configured to:
   utilize the camera to detect, from a physical object, content associated with one or more destinations of an itinerary;
   construct the itinerary, wherein the itinerary comprises an ordered list of the one or more destinations, and routing information from an apparatus to the one or more destinations based on the ordered list of the one or more destinations; and
   display the itinerary on the display, wherein the processor is configured to display the itinerary by a display of a code configured to provide the ordered list and the routing information.

2. The kiosk system of claim 1, wherein the physical object is one of a screen of a mobile device and a physical document.

3. The kiosk system of claim 1, wherein the code is a Quick Response (QR) code.

4. The kiosk system of claim 1, wherein the processor is configured to display the itinerary through a display of the ordered list and a display of a map comprising a route from the apparatus to the one or more destinations based on the routing information,
wherein the display is a touch screen interface,
wherein the processor is configured to, in response to input on the ordered list displayed on the touch screen interface that changes the ordered list, reconstruct the itinerary and modify the display of the map based on the input;
wherein the display is configured to display the ordered list and the map such that the ordered list and the map can be received by a user device without any special application installed on the user device.

5. A kiosk system configured to process information from a physical object without requiring any special application or connection from the physical object, the kiosk system comprising:
a display;
a camera; and
a processor, configured to:
utilize the camera to detect, from a physical object content associated with one or more destinations of an itinerary;
construct the itinerary, wherein the itinerary comprises an ordered list of the one or more destinations, and routing information from an apparatus to the one or more destinations based on the ordered list of the one or more destinations; and
display the itinerary on the display,
wherein the processor is configured to utilize the camera to detect, from the physical object, one or more destinations for the itinerary through:
detecting, from the physical object, one or more text regions;
determining, from the one or more text regions, at least one of a title, a keyword, and an address; and
determining the one or more destinations for the itinerary through conducting a search of the at least one of the title, the keyword, and the address.

6. The kiosk system of claim 5, wherein the processor is configured to determine, from the one or more text regions, at least one of the title, the keyword and the address through:
providing the detected one or more detected text on the display based on one or more parameters;
processing a user selection of the provided one or more detected text as the at least one of the title and the address.

7. A method for operating a kiosk system to process information from a physical object without requiring any special application or connection from the physical object, comprising:
utilizing a camera to detect, from a physical object, content associated with one or more destinations of an itinerary;
constructing the itinerary, wherein the itinerary comprises an ordered list of the one or more destinations, and routing information from an apparatus to the one or more destinations based on the ordered list of the one or more destinations; and
display the itinerary,
wherein the itinerary is displayed by a display of a code configured to provide the ordered list and the routing information.

8. The method of claim 7, wherein the physical object is one of a screen of a mobile device and a physical document.

9. The method of claim 7, wherein the code is a Quick Response (QR) code.

10. The method of claim 7, wherein the displaying the itinerary comprises displaying of the ordered list and displaying of a map comprising a route from the kiosk system to the one or more destinations based on the routing information,
wherein the display is a touch screen interface,
in response to input on the ordered list displayed on the touch screen interface that changes the ordered list, reconstructing the itinerary and modifying the display of the map based on the input;
wherein the display is configured to display the ordered list and the map such that the ordered list and the map can be received by a user device without any special application installed on the user device.

11. The method of claim 7, wherein the utilizing the camera to detect, from the physical object, one or more destinations for the itinerary comprises:
detecting, from the physical object, one or more text regions;
determining, from the one or more text regions, at least one of a title and an address; and
determining the one or more destinations for the itinerary through conducting a search of the at least one of the title and the address.

12. The method of claim 11, wherein the determining, from the one or more text regions, at least one of the title and the address comprises:
providing the detected one or more detected text on the display based on one or more parameters;
processing a user selection of the provided one or more detected text as the at least one of the title and the address.

13. A non-transitory computer readable medium, storing instructions for a kiosk system to process information from a physical object without requiring any special application or connection from the physical object, the instructions comprising:
utilizing a camera to detect, from a physical object, content associated with one or more destinations of an itinerary;
constructing the itinerary, wherein the itinerary comprises an ordered list of the one or more destinations, and routing information from an apparatus to the one or more destinations based on the ordered list of the one or more destinations; and
displaying the itinerary, wherein the itinerary is displayed by a display of a code configured to provide the ordered list and the routing information.

14. The non-transitory computer readable medium of claim 13, wherein the physical object is one of a screen of a mobile device and a physical document.

15. The non-transitory computer readable medium of claim 13, wherein the code comprises displaying a Quick Response (QR) code.

16. The non-transitory computer readable medium of claim 13, wherein the displaying the itinerary comprises displaying of the ordered list and displaying of a map comprising a route from the kiosk system to the one or more destinations based on the routing information,
    wherein the display is a touch screen interface,
        in response to input on the ordered list displayed on the touch screen interface that changes the ordered list, reconstructing the itinerary and modifying the display of the map based on the input;
    wherein the display is configured to display the ordered list and the map such that the ordered list and the map can be received by a user device without any special application installed on the user device.

17. The non-transitory computer readable medium of claim 13, wherein the utilizing the camera to detect, from the physical object, one or more destinations for the itinerary comprises:
    detecting, from the physical object, one or more text regions;
        determining, from the one or more text regions, at least one of a title and an address; and
        determining the one or more destinations for the itinerary through conducting a search of the at least one of the title and the address.

18. The non-transitory computer readable medium of claim 17, wherein the determining, from the one or more text regions, at least one of the title and the address comprises:
    providing the detected one or more detected text on the display based on one or more parameters;
    processing a user selection of the provided one or more detected text as the at least one of the title and the address.

\* \* \* \* \*